Oct. 19, 1926.
H. W. GRIFFIN
1,603,763
FEED MECHANISM
Filed April 13, 1926   2 Sheets-Sheet 1
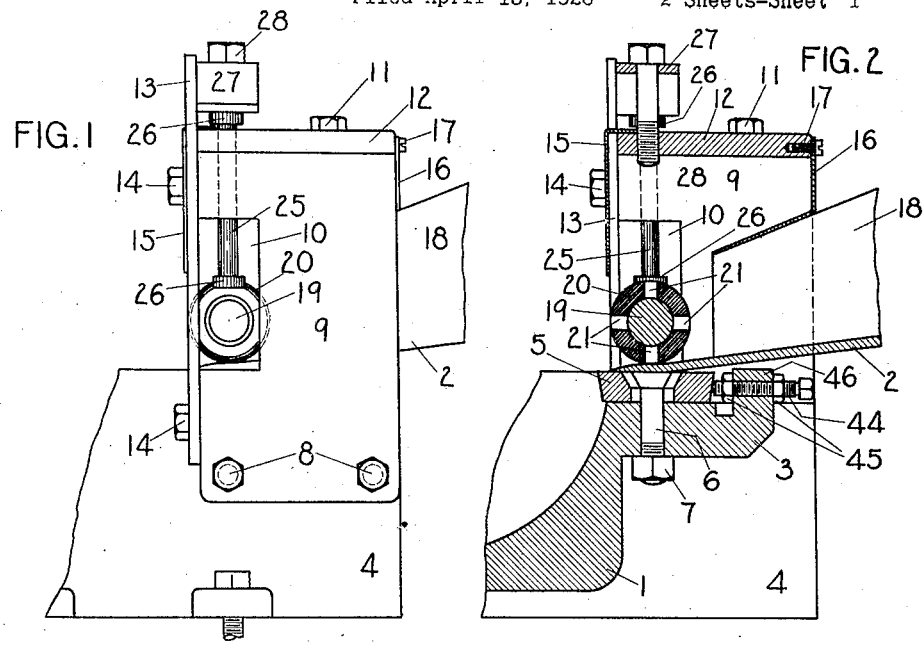
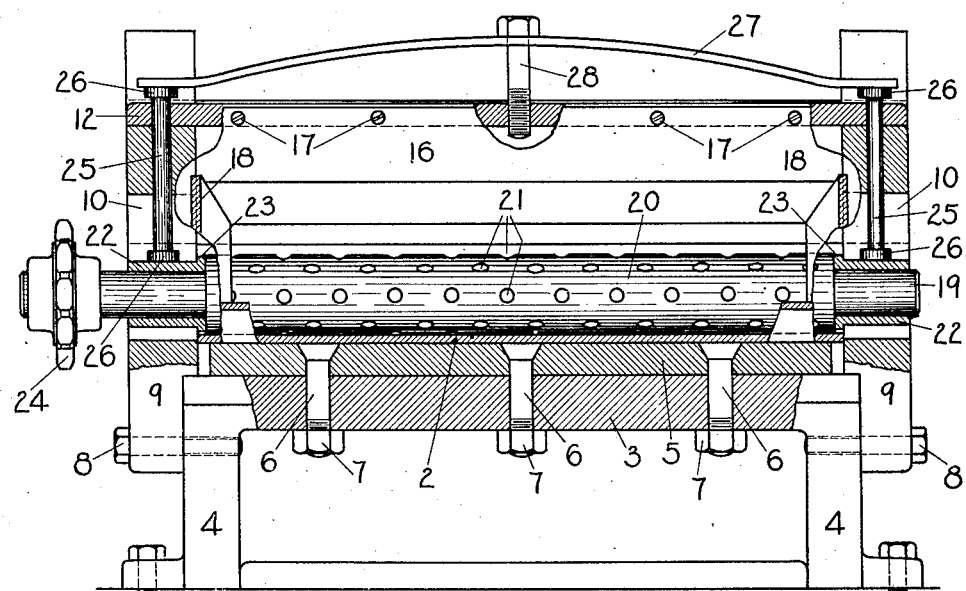
INVENTOR.
Harry W. Griffin,
BY
Frank A. Cutter,
ATTORNEY.

Oct. 19, 1926.
H. W. GRIFFIN
1,603,763
FEED MECHANISM
Filed April 13, 1926    2 Sheets-Sheet 2
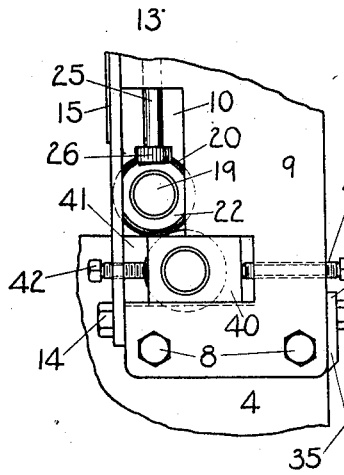
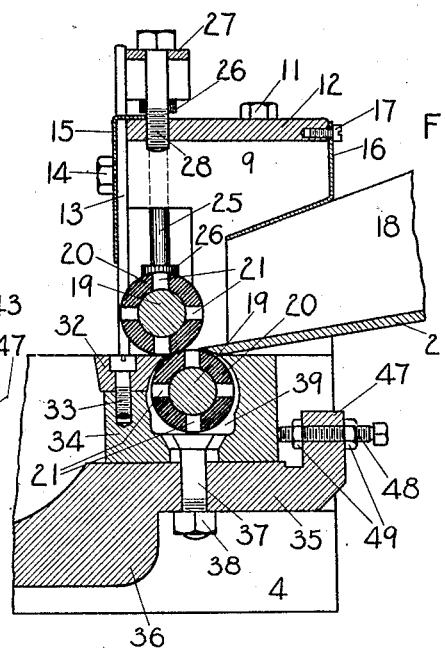
INVENTOR.
Harry W. Griffin.
BY
Frank A. Cutter,
ATTORNEY.

Patented Oct. 19, 1926.

1,603,763

UNITED STATES PATENT OFFICE.

HARRY W. GRIFFIN, OF RIEGELSVILLE, NEW JERSEY, ASSIGNOR TO TAYLOR, STILES AND COMPANY, OF RIEGELSVILLE, NEW JERSEY, A CORPORATION OF NEW JERSEY.

FEED MECHANISM.

Application filed April 13, 1926. Serial No. 101,665.

My invention relates to improvements in machines for cutting or shredding waste paper, rags, and other waste material, and more particularly to the mechanisms of such machines whereby the waste material is fed to the cutting elements, and consists essentially of a certain peculiar feed roll having a yielding periphery which preferably is recessed, wherefore said roll might be termed a suction roll, means to journal under tension said roll over the bed-knife of the shredder with which in practice this feed mechanism is incorporated, and the feed box, and other parts and members of said shredder needed to complete said mechanism, together with such other parts and members as may be necessary or desirable in order to render the mechanism complete and serviceable in every respect, all as hereinafter set forth.

The present invention is an improvement of the waste-paper shredder, or of the feed mechanism thereof, covered by Letters Patent of the United States, No. 1,481,058, dated January 15, 1924.

In the shredder of the aforesaid patent, difficulty is experienced, in cutting old or waste cards, records, bonds, and the like, and especially in cutting them so fine or into such minute pieces that the possibility of identification after they leave said shredder is entirely removed. The failure to cut waste material of this kind to a sufficient degree of fineness is due largely to the inability of the old feed mechanism to control the material while fed to the knives and being shredded thereby. The primary object of my invention is, therefore, to produce a comparatively simple, yet strong and durable, feed mechanism, which is capable of firmly gripping the stock or material and feeding the same to the knives of a shredder in such a manner that it is shredded to the required degree of fineness, thus insuring absolutely the impossibility of escape from the shredder of a piece large enough for identification.

Another object is to provide mechanism, of the class described, which can be applied to the shredder of the aforesaid patent, and to other shredders as well, in place of the feed mechanisms with which they are originally equipped, without making extensive changes or material alterations in the constructions of the original machines.

A further object is to provide a practical suction feed roll for waste material shredders.

Other objects and advantages will appear in the course of the following description.

I attain the objects and secure the advantages of my invention by the mechanism illustrated in the accompanying drawings, in which—

Figure 1 is an end elevation of a feed mechanism which embodies a practical form of my invention; Fig. 2, a central, transverse, vertical section through said mechanism; Fig. 3, a rear elevation of said mechanism, with parts thereof broken away and in section in order more clearly to disclose the construction of other parts; Fig. 4, an end elevation of a modified type of said feed roll; Fig. 5, a side elevation of said roll; Fig. 6, an end elevation of a modified form of the feed mechanism, and, Fig. 7, a central, transverse, vertical section through the mechanism shown in the preceding view.

Similar reference characters designate similar parts throughout the several views.

Referring to Figs. 1, 2, and 3, it will be observed that I have therein shown a bed 1, and the front-end portion of a feed box or trough 2. The trough 2, at the rear end, is supported in the manner illustrated in Patent No. 1,481,058, or in any other suitable manner. The bed 1 is hollowed out in front, and has a rearward extension 3 at the top, and said bed and extension are located between and integral with vertical end pieces 4—4 that are designed to be mounted on and bolted or otherwise secured to the frame of a shredder, such as that illustrated in said patent. The trough 2 extends forwardly between the end pieces 4 and over the extension 3, and rests at the front end on a bed-knife 5. By means of a plurality of bolts 6 and nuts 7 the bed-knife 5 is secured to the extension 3, with the front, cutting edge of said knife projecting over the concave part of the bed 1, and thus being in cutting position. Each bolt 6 passes downwardly through a transverse slot in the bed-knife 5, with the head of said bolt countersunk in such slotted part of said bed-knife, and through a vertical opening in the extension 3, to receive one of the nuts 7 on the lower, protruding terminal of said bolt.

Obviously the parts and members thus far described are old and well known.

Bolted, as at 8, or otherwise secured, to each end piece 4, on the outside thereof, is a bearing upright which rises above said end piece, and has a recess or opening 10 in the front edge thereof, said opening extending upwardly from the horizontal plane of the top edge of said end piece. Bolted, as at 11, or otherwise secured, to the tops of the uprights 9 is a horizontal cross-piece or plate 12. The recess 10 in each upright 9 is converted into a slot by means of a vertical bar 13 bolted, as at 14, or otherwise secured, to the front edge of said upright. The two bars 13 extend above the top of the plate 12. A thin plate 15 extends between the bars 13 and across the front faces thereof, to which said plate is attached by means of the bolts 14. At the top the plate 15, between the bars 13, is bent rearwardly over the top of the plate 12. A thin plate 16 extends across between the rear edges of the uprights 9, and is secured by screws 17, or other means, to the back edge of the plate 12. The plate 16 first extends directly downwardly from the plate 12, and then inclines downwardly and forwardly under said plate and between the uprights 9. The plates 15 and 16 strengthen the supporting structure, and assist in making an enclosure for the feed roll.

The feed trough 2 comprises a bottom and side pieces 18, which bottom extends forwardly beyond the front edges of said side pieces onto the bed-knife 5. The parts of the sides 18 that are between the uprights 9 fit under the inclined part of the plate 16, substantially as shown in Fig. 2. The front end of the plate 16 is flush with the front edges of the trough sides. Thus the plate 16 provides a top for a portion of the trough, and assists in holding said trough at the front end in place.

A feed roll is provided to bear on that portion of the bottom of the trough 2 which extends beyond the side pieces 18. This feed roll consists of a core or shaft 19 and a peripheral covering 20 of suitable yielding material, preferably rubber, in which is a plurality or multiplicity of radial openings 21. Thus constructed the feed roll is capable of exerting suction or producing a suction action. When this suction feed roll is forced against the waste stock or material on the bottom of the trough 2, said roll not only exerts yielding pressure thereon, which tends to stabilize the action of the roll, due to the character of the covering 20, but also grips and holds such material unswerving in its course, due to the partial vacuums formed by the recessed portions of said covering as they come into contact with the material, with the result that the material, as fed forward by the roll, is so controlled as to insure the complete and fine cutting or shredding thereof. The feed roll is located close enough to the cutting edge of the bed-knife 5, adjacent to which edge the fly-knives (not shown) revolve, to enable said roll to control the waste material to the best advantage.

The feed-roll shaft 19 extends through the slots 10 in the bearing uprights 9, and at one end beyond the upright at that end, and bushings 22—22 are mounted on the portions of said shaft that are in said slots. Each bushing 22 has at the inner end a flange 23 that is interposed between the contiguous end of the covering 20 and the inner face of the contiguous upright 9. Thus the bushings 22, the shaft 19, and the covering 20 are held against endwise movement. The diameter of that part of each bushing 22 which is in one of the slots 10 is greater than the width of the slot, and said bushing is slabbed off on opposite sides to enable the same to fit and slide up and down within said slot, as shown in Fig. 1. The shaft 19 with its covering 20 is free to revolve in the bushings 22, but said bushings are held against rotation by the vertical edges of the slots 12 behind and the bars 13 in front. A sprocket-wheel 24 is secured to the terminal of the shaft 19 which extends some distance beyond one of the bushings 22, and by means of this sprocket-wheel and a sprocket-chain (not shown) the feed roll is driven in the direction to actuate the material in the box 2 forwardly and cause it to move out over the cutting edge of the bed-knife 5, and at the proper speed.

Slidingly arranged in the plate 12, and that portion of each bearing upright 9 that is above the top of the recess 10 therein, is a vertical rod 25 having at the base an enlargement 26 to bear on top of the bushing 22 below, and at the top a similar enlargement or head. Each rod 25 is long enough to enable its base to rest on the bushing and its head to be situated above the plate 12 and allow for a sufficient amount of vertical movement or play. The bushings 22 on top may be flattened, to afford better bearing surfaces for the bases 26 of the rods 25. A bow spring 27 is located above the plate 12 and has its terminals arranged to bear on the heads 26 of the rods 25. An adjusting bolt 28 passes downwardly through the center of the spring 27 and is tapped into the plate 12 below. The front edges of the spring 27 bear against the back sides of the upper terminals of the bars 13, and said bars assist the bolt 28 in holding said spring in position.

The spring 27 exerts a downward pressure on the feed roll, through the medium of the rods 25 and the bushings 22, and the amount of this pressure is regulated by means of the adjusting bolt 28, being increased when said bolt is screwed downwardly, and decreased when said bolt is screwed upwardly. Provision is thus made for accommodating the feed roll and its pressure to the particular kind of material which is being fed thereby.

In operation, the waste material is placed in the feed trough 2 and pushed forward beneath the revolving feed roll, and said roll firmly grips said material between the bottom of said trough and the covering 20, holds it with the necessary amount of force, and presents it to the cutting elements in such a manner that there is no slipping of the material and the same is cut into very fine pieces. With an ordinary feed roll and in the absence of suitable tension mechanism, the heavier and finer grades of waste material can not be held with a sufficient degree of firmness, consequently they slip and quite sizable pieces escape the knives.

The feed-roll covering 20 might be made solid or without the openings 21 therein, and in some cases fairly good results be obtained therewith, but I have found that the feed roll with the recessed covering is far superior to one without such covering.

It might be feasible to provide a feed roll with a periphery having recesses formed therein by corrugating or fluting, an example of which is illustrated in Figs. 4 and 5. Here the shaft 19 has mounted on and secured thereto a yielding or rubber covering 29 in the outer surface of which are spiral grooves 30 between similar spiral ribs 31. It is preferred that the ribs 31 be spiral rather than straight, because of the superior feeding quality of the former.

If desired, two feed rolls may be provided instead of one, and an example of a construction wherein two feed rolls are used is illustrated in Figs. 6 and 7. In this construction there are upper and under feed rolls, and the upper roll with the tension mechanism therefor is substantially the same as in the other case. The lower roll is similar in every respect to the upper roll, but is held in suitable, normally stationary bearings at the ends, and driven merely by contact with said upper roll, or, if desired, the power may be applied to the lower roll and the upper roll be driven therefrom.

A narrower bed knife 32 is here provided, and the same is secured by screws, one of which appears at 33, or other suitable means, to a bed-block 34 mounted on a horizontal support or extension 35 from a bed 36. The extension 35 is lower than the support 3, and the bed 36 is lower than the bed 1, but there are end pieces 4 which correspond with those in the first example. The back edge of the bed-knife 32 is made concave to enable the top thereof to be located very close to the lower feed roll, in order that there should be no space between the two for the material to work down into. The floor of the feed trough 2, in this case, does not extend under the upper feed roll, but only as far as the lower feed roll, which latter is set back a little relative to the former. The front edge of the floor of the feed trough is made concave to enable the bottom feed roll at the top to be located very close to such edge. The bed-block 34 is adjustably secured to the extension 35 by means of screws and bolts, one such bolt and one such nut appearing at 37 and 38, respectively. There are slots in the bed-block 34 for the bolts by means of which the same is secured to the extension, and this adjustable feature is similar to that employed in connection with the bed-knife 5. The bed-block 34 is chambered, as represented at 39, to accommodate the lower feed roll.

The lower feed-roll shaft 19 extends at each end, beyond the covering 20 on said shaft, into a bearing-block 40 which is arranged for horizontal adjustment in a recess 41 in each bearing upright 9. The recess 41 is below the recess 10 in the same upright 9, and is closed at the front end by the bar 13 which is secured to said upright. A horizontal bolt 42 is tapped into and through each bar 9 and is adapted to bear against the front edge of the block 40 behind said bar, and a bolt 43 is tapped into and through each upright 9 and is adapted to bear on the back edge of said block. When the bolts 42 and 43 in each set are screwed tightly against the front and rear edges of the block 40 between said screws, said block is held rigidly in place in its slot 41. Upon turning the bolt 42 outwardly and the bolt 43 inwardly, at each end, the blocks 40 are moved forward, and the space between the lower feed roll and the upper feed roll consequently decreased, or the amount of pressure between said feed rolls increased, depending on whether or not the feed rolls be in actual contact at the time the adjustment is made; and, upon turning said bolt 3 outwardly and said bolt 42 inwardly, at each end, such space or amount of pressure is increased. Only very little adjustment of the lower feed roll is ever needed. As herein illustrated, the feed rolls are in contact with each other, and the upper feed roll is in contact with the bed-knife 32, while in the first example the feed roll is shown in contact with the floor of the feed trough.

As the two feed rolls revolve, the waste material from the box 2 enters into the bite between said rolls and is actuated by said rolls out onto the bed-knife 32 and over the cutting edge thereof, the two rolls operating in much the same way as does the single roll to grasp the material firmly and move it over said cutting edge, without permitting any slipping on the part of the material to occur. The material not only is grasped between the two feed rolls, but also between the upper feed roll and the bed-knife 32. The feed rolls are driven at the rate of speed necessary to move the material to be shredded only so fast as the same can be properly cut by the fly-knives which operate in close relationship to the bed-knife, as is the case in the single feed-roll mechanism.

The customary provision is made for adjusting the bed-knife 5 on the extension 3, when the nuts 7 are loosened, a plurality of bolts and nuts being provided for the purpose, one of such bolts being represented at 44 and two of the nuts at 45, in Fig. 2. Each bolt 44 passes through a flange 46 which rises from the back edge of the extension 3, and bears at the inner end on the rear edge of the bed-knife 5, and one of the nuts 45 is placed on said bolt in front of and behind said flange. When the nuts 45 are tightened against the flange 46, the bolt 44 is held securely in place, and with its companion or companions affords an abutment for the back edge of the bed-knife 5. Upon loosening the nuts 45, the bolt 44 with its companion or companions can be moved forwardly or rearwardly, accordingly to advance the bed-knife 5 or permit the same to be moved back, after which said nuts are tightened.

As shown in Fig. 7, the extension 35 has rising from its rear edge a flange 47, and inserted in said flange is a horizontal bolt 48 on which are mounted two nuts 49 one in front of and the other behind said flange. There are usually two or more of these bolts and a corresponding number of nuts 49. Each bolt 48 bears at the forward end on the back side of the bed-block 34, and the adjustment on the extension 35 of said block with its bed-knife 32 is effected in substantially the same manner as is the adjustment of the bed-knife 5 on the extension 3.

More or less change in the shape, size, construction, and arrangement of some or all of the parts of this mechanism, in addition to those hereinbefore specifically pointed out, may be made without departing from the spirit of my invention, or exceeding the scope of what is claimed.

What I claim as my invention, and desire to secure by Letters Patent, is—

1. The combination, in feed mechanism of the class described, with a bed-knife, and a feed trough, of a feed roll having a yielding periphery with radial suction openings therein, and provided with bushings at the ends, means to position said roll in operative relation to said bed-knife and in direct contact with material on the floor of said trough, said means comprising bearing uprights having therein openings to receive and guide said bushings, and yielding means to force said bushings downwardly in said openings and cause said roll to bear on material beneath the same.

2. The combination, in feed mechanism of the class described, with a bed-knife, and a feed trough, of a feed roll provided at the ends with bushings, uprights having openings therein to receive and guide said bushings, rods slidingly arranged in said uprights above said bushings, a cross plate between said uprights, a bow spring having its terminals bearing on the upper ends of said rods, and an adjusting bolt passing through said spring and tapped into said plate, whereby said roll is caused to bear with a yielding pressure on material beneath the same.

3. The combination, in feed mechanism of the class described, with a bed-knife, and a feed trough, of a suction feed roll provided at the ends with bushings, uprights having openings therein to receive and guide said bushings, rods slidingly arranged in said uprights above said bushings, a cross plate between said uprights, a bow spring having its terminals bearing on the upper ends of said rods, and an adjusting bolt passing through said spring and tapped into said plate, whereby said roll is caused to bear with a yielding pressure on material beneath the same.

4. The combination, in feed mechanism of the class described, with a bed-knife, and a feed trough, of a feed roll having bushings at the ends, recessed bearing uprights, a cross plate between said uprights, bars attached to the front edges of said uprights, converting the recesses in said uprights into slots, and extending above said plate, said bushings being received in said slots and permitted to move up and down therein, rods slidingly arranged in said uprights, and bearing at their lower ends on said bushings, a bow spring having its terminals bearing on said rods at their upper ends, and an adjusting screw passing through said spring and tapped into said plate, the front edge of said spring being in contact with the back sides of the upper terminal portions of said bars, the construction and arrangement being such that said roll is caused to bear with a yielding pressure on material beneath the same.

5. In feed mechanism of the class described, a feed roll having a periphery of yielding material in which there are openings, and which when forcibly brought into contact with the material to be fed acts on such material by suction.

HARRY W. GRIFFIN.